(No Model.)
J. L. B. BODEL & J. L. F. BRAUER.
UNION OR COUPLING FOR PIPES AND TUBES.
No. 269,626. Patented Dec. 26, 1882.
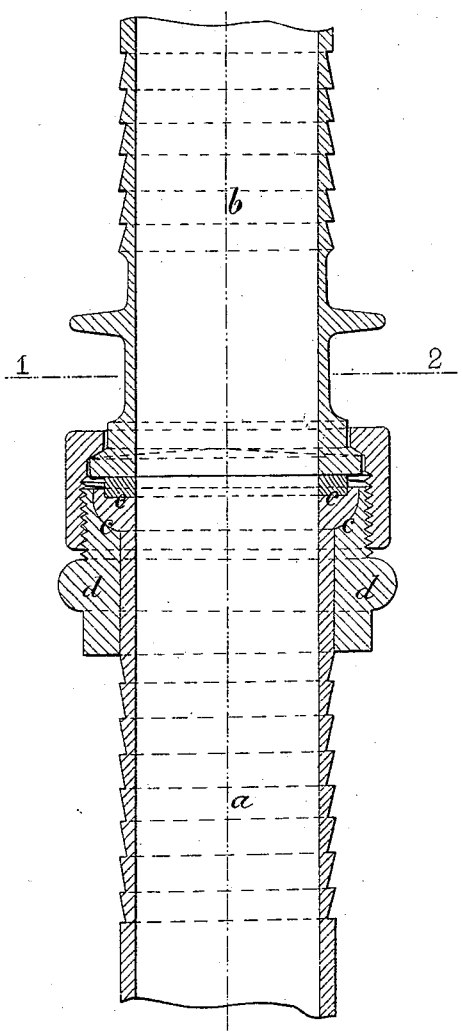
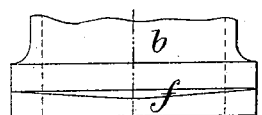
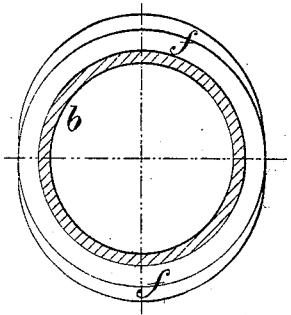
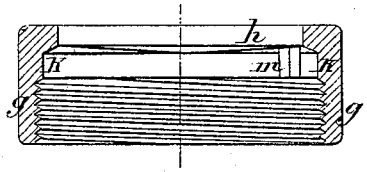
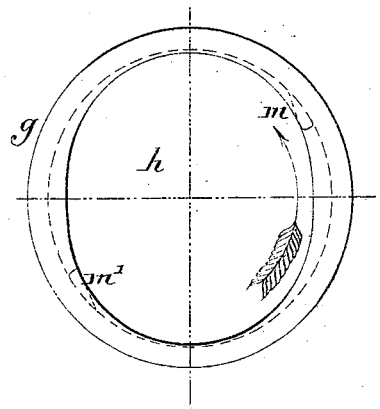
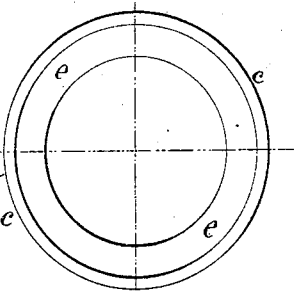
Witnesses
John E. Tunbridge
John M. Spew
Inventors
Jules L. B. Bodel
Joseph L. F. Brauer
by their attorneys
Briesen & Betts
N. PETERS, Photo-Lithographer, Washington, D. C.

United States Patent Office.

JULES L. B. BODEL AND JOSEPH L. F. BRAUER, OF PARIS, FRANCE.

UNION OR COUPLING FOR PIPES AND TUBES.

SPECIFICATION forming part of Letters Patent No. 269,626, dated December 26, 1882.

Application filed August 24, 1882. (No model.) Patented in France May 19, 1882, No. 148,883; in Belgium July 24, 1882, No. 58,552, and in England July 25, 1882, No. 3,536.

*To all whom it may concern:*

Be it known that we, JULES LOUIS BERNARDIN BODEL and JOSEPH LAURENT FRANÇOIS BRAUER, subjects of France and residents of Paris, have invented a new or Improved Union or Coupling with an Elastic Joint for Connecting together Pipes and Tubes in general, (for which we have obtained Letters Patent in France, dated May 19, 1882, No. 148,883, for fifteen years; Belgium, dated July 24, 1882, No. 58,552, for fifteen years; England, dated July 25, 1882, No. 3,536, for fourteen years;) and we do hereby declare that the following is a full, clear, and exact description of the invention, which will enable others skilled in the art to which it appertains to make and use the same, reference being had to the accompanying drawings, and to the letters or figures of reference marked thereon, which form a part of this specification.

The invention relates to a new or improved union or coupling with an elastic joint for connecting together pipes and tubes. The arrangement may be called a "variable-pressure union," because it is possible to effect the connection of the pipes or tubes more or less firmly while preserving elasticity and absolute tightness to the joint, whatever the internal pressure may be.

The annexed drawings represent an example of the new or improved union or coupling.

Figure 1 is a longitudinal section of the improved joint. Fig. 2 is an external view of the end of one of the pipes or tubes to be joined. Fig. 3 is a transverse section on line 1 2 of Fig. 1. Fig. 4 shows in section one of the tightening-rings. Fig. 5 is a plan of the said ring, and Fig. 6 is a plan of the end of the other pipe.

$a$ and $b$ show the pipes or tubes to be joined. $a$ is cylindrical in all its parts, with one end, $c$, swelled out or enlarged and hollowed out or recessed at $e$ for the reception of a washer, $r$, of india-rubber or other suitable elastic and compressible material. On the end of the pipe $a$ is fitted a ring, $d$, which covers and stops against the enlargement $c$. It is screw-threaded externally at its front or outer part. The pipe or tube $b$ is also cylindrical, except at the shoulder $f$ at its end, which is of an elliptic or oval form. Another ring, $g$, which is internally screw-threaded, takes onto the ring $d$, the internal thread of the first taking into the external thread of the latter. The ring $g$ is formed with an oval or elliptic opening, $h$, corresponding to the oval or elliptic form of the shoulder $f$ of the pipe $b$, so that the said shoulder $f$ enters and passes easily through the opening $h$. The elliptic or oval opening $h$ of the ring $g$ is outside of a cylindrical recess, $k$, which is close to the internally screw-threaded part above mentioned. In the recess $k$ are one or two stops, $m$ $m'$, diametrically opposite to each other. Having put in place the packing or elastic washer on the end of the pipe $a$, the ring $d$ is also placed thereon, and the second ring, $g$, is screwed onto the said ring $d$. Then the end $f$ of the pipe $b$ is passed through the opening $h$, care being taken to make the oval or elliptic shoulder $f$ coincide with the oval or elliptic opening $h$ of the ring $g$. Having passed the shoulder $f$ through the opening $h$, it is only necessary to turn the ring $g$ about half a revolution until the stops $m$ $m'$ prevent further movement. The union is then made. By screwing the ring $g$ more or less tightly upon the ring $d$ the india-rubber washer is squeezed with greater or lesser force—that is to say, with a pressure which may be varied at pleasure according to the pressure which the joint is intended to resist and to which the liquids, gases, fluids, or vapors may be subjected that the pipes so joined are intended to conduct.

The component parts may be varied as to form, materials, and dimensions, and the new or improved union or coupling may also be applied to connect together all kinds of pipes, tubes, or conduits in which liquids, fluids, gases, vapors, &c., circulate.

We claim—

The pipe $a$, having enlargement $c$, combined with threaded rings $d$ and $g$, and with pipe $b$, having oval enlargement $f$, the ring $g$, having oval aperture $h$, recess $k$, and stop or stops $m$, substantially as herein shown and described.

JULES L. B. BODEL.
JOSEPH L. F. BRAUER.

Witnesses:
G. DE JEAN,
A. BLÉTRY.